(12) United States Patent
Caldwell

(10) Patent No.: US 10,460,391 B2
(45) Date of Patent: Oct. 29, 2019

(54) HISTORICAL TRANSACTION-BASED ACCOUNT MONITORING

(71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 613 days.

(21) Appl. No.: 14/977,631

(22) Filed: Dec. 21, 2015

(65) Prior Publication Data

US 2016/0180466 A1  Jun. 23, 2016

Related U.S. Application Data

(60) Provisional application No. 62/094,921, filed on Dec. 19, 2014.

(51) Int. Cl.
*G06Q 40/06* (2012.01)
*G06T 11/20* (2006.01)

(52) U.S. Cl.
CPC ............ *G06Q 40/06* (2013.01); *G06T 11/206* (2013.01)

(58) Field of Classification Search
CPC ...... G06Q 40/06; G06Q 20/322; G06Q 20/38; G06T 11/206
USPC ........ 705/17, 7.31, 39, 35, 26.1, 35 R, 36 R; 340/573.4
See application file for complete search history.

(56) References Cited

U.S. PATENT DOCUMENTS

| | | | |
|---|---|---|---|
| 2005/0201489 A1* | 9/2005 | Mobley | H04L 25/063 375/317 |
| 2007/0146005 A1* | 6/2007 | Sauber | G06F 17/5045 326/37 |
| 2009/0076978 A1* | 3/2009 | Dayan | G06Q 40/04 705/36 R |
| 2012/0330812 A1* | 12/2012 | Bouchard | G06Q 40/04 705/37 |
| 2013/0024364 A1* | 1/2013 | Shrivastava | G06Q 20/38 705/39 |
| 2013/0060708 A1* | 3/2013 | Oskolkov | G06Q 20/10 705/75 |
| 2014/0136381 A1* | 5/2014 | Joseph | G06Q 40/02 705/35 |

(Continued)

*Primary Examiner* — Vanel Frenel
(74) *Attorney, Agent, or Firm* — Kunzler Bean & Adamson, PC

(57) ABSTRACT

Apparatuses, systems, methods, and program products are disclosed for historical transaction-based account monitoring. A method includes receiving historical and current transaction data for a plurality of user accounts at a mobile device over a computer network. A method includes normalizing transactions of the historical transaction data for the historical time period based on one or more transactions of the historical transaction data that correspond to one or more transactions of the current transaction data. A method includes generating and presenting a graphical representation of the historical transaction data and a graphical representation of the current transaction data within an interactive interface on the touch screen display. A method includes dynamically presenting one or more details of a transaction in response to a user selecting a transaction on the graphical representation of the historical transaction data or the graphical representation of the current transaction data, using the touch screen display.

20 Claims, 6 Drawing Sheets

(56) References Cited

U.S. PATENT DOCUMENTS

2015/0324783 A1* 11/2015 Desai ................... G06Q 20/322
 705/39
2017/0228808 A1* 8/2017 Kumar ............... G06Q 30/0631

* cited by examiner

HISTORICAL TRANSACTION-BASED ACCOUNT MONITORING

CROSS-REFERENCES TO RELATED APPLICATIONS

This application claims the benefit of U.S. Provisional Patent Application No. 62/094,921 entitled "INVENTORY AND ASSET FLOW VISUALIZATION AND COMPARATOR" and filed on Dec. 19, 2014, for John Ryan Caldwell, which is incorporated herein by reference.

FIELD

This invention relates to account transactions and more particularly relates to monitoring accounts based on current and historical transactions.

BACKGROUND

In account management, data maintenance and utilization may be paramount for providing the best possible service to clients, while increasing the profitability of an organization. Transactions such as purchases, automatic payments and deposits, transfers, and other repeated transactions have generally been facilitated by entities, payees, and employers for the convenience of all involved. Large amounts of data may exist for all of these services and transactions. In addition, the transactions by the customer may be used to track inventory and asset flow for many kinds of entities, such as individuals, merchants, customers, warehouses, shippers, and the like. Due in large part to advances in computing technologies, transactional data in its many forms can be tracked and used to provide meaningful feedback to users.

SUMMARY

Apparatuses for historical transaction-based account monitoring are disclosed. Systems and methods also perform certain functions of the apparatuses. An apparatus, in one embodiment, includes a display device and a semiconductor integrated circuit device. A semiconductor integrated circuit device, in one embodiment, includes one or more pins configured to receive, over a computer network, aggregated transaction data for a plurality of accounts. Transaction data may include transaction data for a historical time period and/or transaction data for a current time period.

In one embodiment, a semiconductor integrated circuit device includes one or more hardware circuits configured to determine one or more transactions of historical transaction data that correspond to one or more transactions of current transaction data. In some embodiments, a semiconductor integrated circuit device includes one or more hardware circuits configured to normalize corresponding transactions of historical transaction data for a historical time period.

In certain embodiments, a semiconductor integrated circuit device includes one or more hardware circuits configured to generate a graphical representation of historical transaction data and a graphical representation of current transaction data. In one embodiment, a semiconductor integrated circuit device includes one or more hardware circuits configured to display a graphical representation of historical transaction data and/or a graphical representation of current transaction data within an interface on a display device. A graphical representation of current transaction data may overlay a graphical representation of historical transaction data.

In one embodiment, an apparatus includes a mobile device and one or more sensors electrically coupled to the mobile device. A mobile device, in a further embodiment, includes a graph module that generates a graphical representation of transaction data for a historical time period and a graphical representation of transaction data for a current time period. Transaction data may be based on a set of aggregated transaction data for a plurality of accounts.

In some embodiments, a mobile device includes a budget module that creates one or more budget plans for a user based on one or more of historical transaction data, current transaction data, and/or one or more user-defined goals. In a further embodiment, a mobile device includes a display module that presents graphical representations of historical transaction data and current transaction data on a display of the mobile device.

In certain embodiments, a mobile device includes a payment module that detects initiation of a mobile payment on the mobile device. A mobile payment, in one embodiment, is initiated using one or more sensors of the mobile device, which may be in wireless communication with one or more sensors of a point of sale device, and configured to process a mobile payment by wirelessly transmitting payment information from the mobile device to the point of sale device. In a further embodiment, a payment module refuses processing a mobile payment from at least one of the plurality of accounts on a mobile device in response to an amount of the mobile payment decreasing a balance of the at least one of the plurality of accounts beyond a user's selected budget plan.

A method, in one embodiment, includes receiving, at a mobile device connected to a computer network, aggregated transaction data for a plurality of accounts. Transaction data may include transaction data for a historical time period and/or transaction data for a current time period. In certain embodiments, a method includes normalizing transactions of historical transaction data for a historical time period based on one or more transactions of the historical transaction data that correspond to one or more transactions of the current transaction data. A method includes, in one embodiment, generating a graphical representation of historical transaction data and/or a graphical representation of current transaction data. In some embodiments, a method includes displaying a graphical representation of historical transaction data and/or a graphical representation of current transaction data within an interactive interface on a touch screen display. A graphical representation of current transaction data may overlay a graphical representation of historical transaction data. In a further embodiment, a method includes dynamically presenting one or more details of a transaction in response to a user selecting a transaction on a graphical representation of historical transaction data and/or a graphical representation of current transaction data, using a touch screen display.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
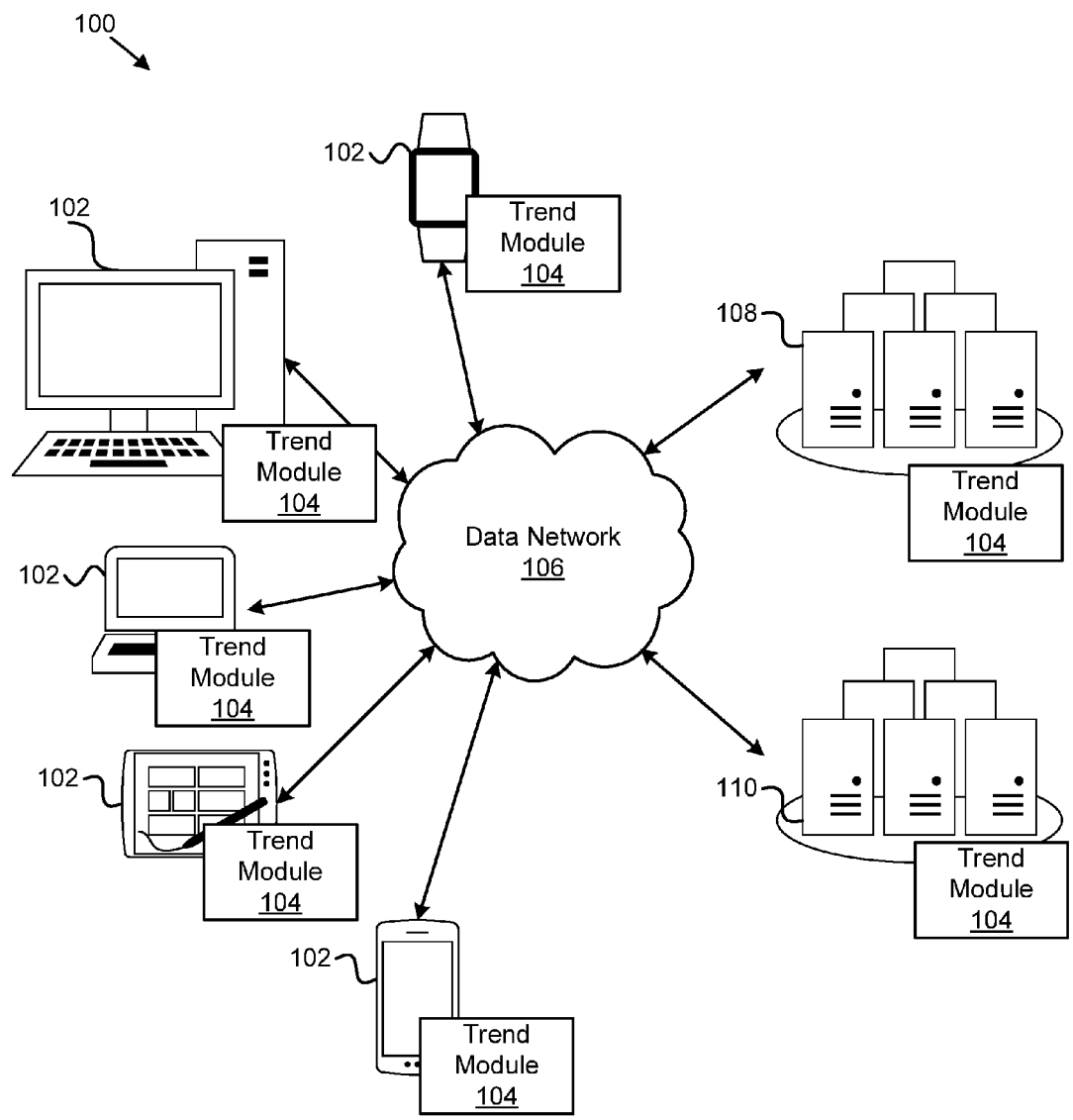
FIG. 1A is a schematic block diagram illustrating one embodiment of a system for historical transaction-based account monitoring.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Aggregated account data generally may provide historical transaction information once it is parsed by a knowledgeable entity. Data relating to everyday transactions, which may or may not be repeated or reoccurring, may provide opportunities for financial service providers, retailers, customers and individuals to utilize such data to achieve goals or otherwise move from one desired result to another. Such transactions, including regular payments made to third parties (e.g., bill-pay) and deposits (e.g., direct deposit), are important services that financial institutions provide to their customers and may be automated, or suggested for automation, for the convenience of customers once discovered in the account data.

For simplicity and clarity the service of making bill payments will be primarily used in the embodiments of the disclosure, however the advantages and features disclosed herein also apply equally to any repeatable transaction or identifiable transaction from within aggregated data. Such services are so important in fact that customers will often select a financial institution and stay with a financial institution due to the automated services like bill-pay over many other factors. A common problem related to suggesting and providing additional services may be that the current transactions of interest may be with data that is stored by third parties and must be aggregated before it can be used. Additionally once the data has been aggregated, this large amount of data must be made usable. Accordingly, systems and methods are disclosed herein for automating the process of identifying transaction from within large aggregation data stores.

FIG. 1A depicts an embodiment of a system 100 for historical transaction-based account monitoring. In one embodiment, the system 100 includes one or more information handling devices 102, one or more trend modules 104, one or more data networks 106, one or more financial institution systems 108, and/or one or more aggregator systems 110. In certain embodiments, even though a specific number of information handling devices 102, trend modules 104, data networks 106, financial institution systems 108, and aggregator systems 110 are depicted in FIG. 1A, one of skill in the art will recognize, in light of this disclosure, that any number of information handling devices 102, trend modules 104, data networks 106, financial institution systems 108, and aggregator systems 110 may be included in the system 100 for historical transaction-based account monitoring.

In one embodiment, the system 100 includes one or more information handling devices 102. The information handing devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to a financial institution system 108 and/or an aggregator system 110 via a data network 106, described below. The information handling devices 102, in a further embodiment, are capable of executing various programs, program code, applications, instructions, functions, or the like. The information handling devices 102 may include one or more sensors, such as proximity sensors, near-field communication sensors, Bluetooth® sensors, infrared sensors, magnetic transmission sensors, and/or the like.

The trend module 104, in certain embodiments, receives historical and current transaction information for a user, which may be aggregated across multiple financial accounts held by the user, to provide financial status and planning tools to the user, such as tools for providing the status of an account, account trends over time, account forecasts, and/or the like. In one embodiment, the trend module 104 is configured to receive aggregated transaction data for a plurality of accounts held by a user at a plurality of financial institutions. The transaction data may include transaction data for a historical time period (e.g., the previous month, the previous year, the previous five years, or the like), and a current time period (e.g., the current year, the current month, or the like). In one embodiment, the trend module 104 determines one or more transactions of the historical transaction data that correspond to one or more transactions of the current transaction data.

In a further embodiment, the trend module 104 normalizes the determined transactions of the historical transactions data for the historical time period. The trend module 104, in some embodiments, generates a graphical representation of the historical transaction data and a graphical representation of the current transaction data, and displays each graphical representation of the transaction data within an interface of a display device. In some embodiments, the graphical representation of the current transaction data overlays the graphical representation of the historical data.

In some embodiments, the trend module 104 is configured to detect initiation of a mobile payment on a mobile device using one or more sensors of the mobile device. In one embodiment, the one or more sensors of the mobile device are in wireless communication with one or more sensors of a point of sale device and are configured to process a mobile payment by wirelessly transmitting payment information from the mobile device to the point of sale device. The trend module 104, in various embodiments, is configured to refuse processing of the mobile payment on the mobile device in response to an amount of the mobile payment decreasing an amount in a user account beyond the user's selected budget plan. In this manner, in certain embodiments, the trend module 104 increases the usability of a budgeting interface by incorporating a graphical representation of a user's account data, based on transactions across various accounts, for a historical time period and a current time period on the same visualization such that the user can compare recent account trends to past account trends. Moreover, the trend module 104, in one embodiment, provides a mechanism to prevent the user from making purchases that do not comply with a user's selected budget plan, which may be created based on the historical and current transaction data, during a wireless or mobile purchase.

In various embodiments, the trend module 104 may be embodied as hardware, software, or some combination of hardware and software. In one embodiment, the trend module 104 may comprise executable program code stored on a non-transitory computer readable storage medium for execution on a processor of an information handling device 102, a device of a financial institution system 108, an aggregator system 110, or the like. For example, the trend module 104 may be embodied as executable program code executing on one or more of an information handling device 102, a financial institution system 108, an aggregator system 110, a combination of one or more of the foregoing, or the like. In such an embodiment, the various modules that perform the operations of the trend module 104, as described below, may be located on an information handling device 102, a financial institution system 108, an aggregator system 110, a combination of the foregoing, and/or the like.

In various embodiments, the trend module 104 may be embodied as a hardware appliance that can be installed or deployed in a financial institution system 108, an aggregator system 110, on a user's information handling device 102, or elsewhere on the data network 106. In certain embodiments, the trend module 104 may comprise a hardware device such as a secure hardware dongle or other hardware appliance device (e.g., a set-top box, a network appliance, or the like) that attaches to another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like). A hardware appliance of the trend module 104 may comprise a power interface, a wired and/or wireless network interface, a graphical interface that attaches to a display, an electronic display, and/or a semiconductor integrated circuit device as described below, configured to perform the functions described herein with regard to the trend module 104.

The trend module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the debt management module 104 may be mounted on a printed circuit board with one or more electrical lines or connections (e.g., to volatile memory, a non-volatile storage medium, a network interface, a peripheral device, a graphical/display interface, and/or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the trend module 104. The trend module 104 may comprise a computer (e.g., a digital computer, an analog computer, a quantum computer, and/or the like) hard-wired to perform its various functions described below for transaction-based debt management and visualization.

The semiconductor integrated circuit device or other hardware appliance of the trend module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the trend module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The financial institution systems 108, in one embodiment, comprise information systems for banking institutions, investment companies, credit card companies, loan servicers, and/or the like. The financial institution systems 108 may maintain and store financial data for a user such as account transactions, account balances, debt data, financial budgets, financial goals, and/or the like. The aggregator systems 110 may be communicatively coupled to the financial institution systems 108 to access the financial data for a user and aggregate the financial data across each of the user's accounts such as checking accounts, investment accounts, retirement accounts, loan accounts, debt accounts, and/or the like. A user, for example, may log in to an aggregator system 110 to view a status of each of the users' accounts located at various financial institutions in a single place, which may increase the usability and effectiveness of the system.

Figure 1B:
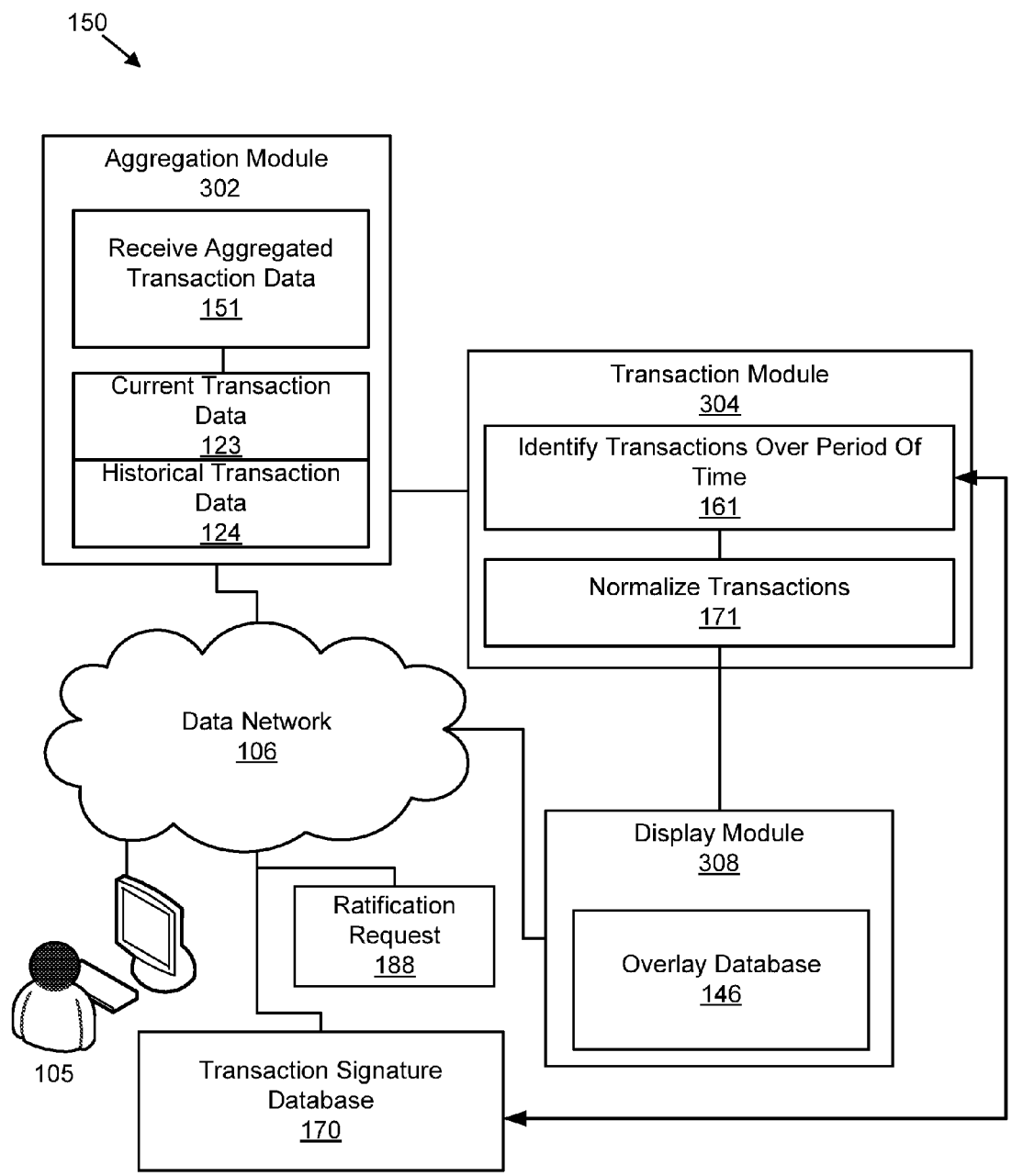
FIG. 1B is a schematic block diagram illustrating one embodiment of a system for historical transaction-based account monitoring.

FIG. 1B illustrates a system 150 that includes a computer environment and network 106 for identifying and providing a user with transaction data relating to the user's assets, funds, inventory, or other resources within aggregated data. Illustrated in the figure is a user 105 that is electronically connected to financial institutions 108 and/or aggregation systems 110 through a network 106. The financial institutions 108 and/or aggregation systems 100 may comprise an aggregation module 302, described below, that may receive aggregated transaction data 151 that may include current transaction data 123 and historical transaction data 124. The system may further comprise a transaction module 304 that identifies transactions for a period of time 161 and normalizes 171 the historical transaction data 124. Additionally, the transaction module 304 may further transmit or receive the transaction data to and/or from a transaction signature database 170.

As further illustrated in the FIG. 1B, the system 150 may comprise a display module 308 running on computer hardware over a data network 106, wherein the display module 308 may utilize an overlay database 146 comprising transaction data relating to the user's assets, funds, inventory, or other resources within aggregated data from financial institutions. The system may further comprise a transaction signature database 170 wherein unique identifiers/keys are stored representing various known or expected transaction types for use in optimizing the system as it performs additional iterations during use. Additionally, as can be seen in the figure, a user may receive a ratification request 188 that may be used to verify the nature of the transactions identified by the method.

Figure 2:
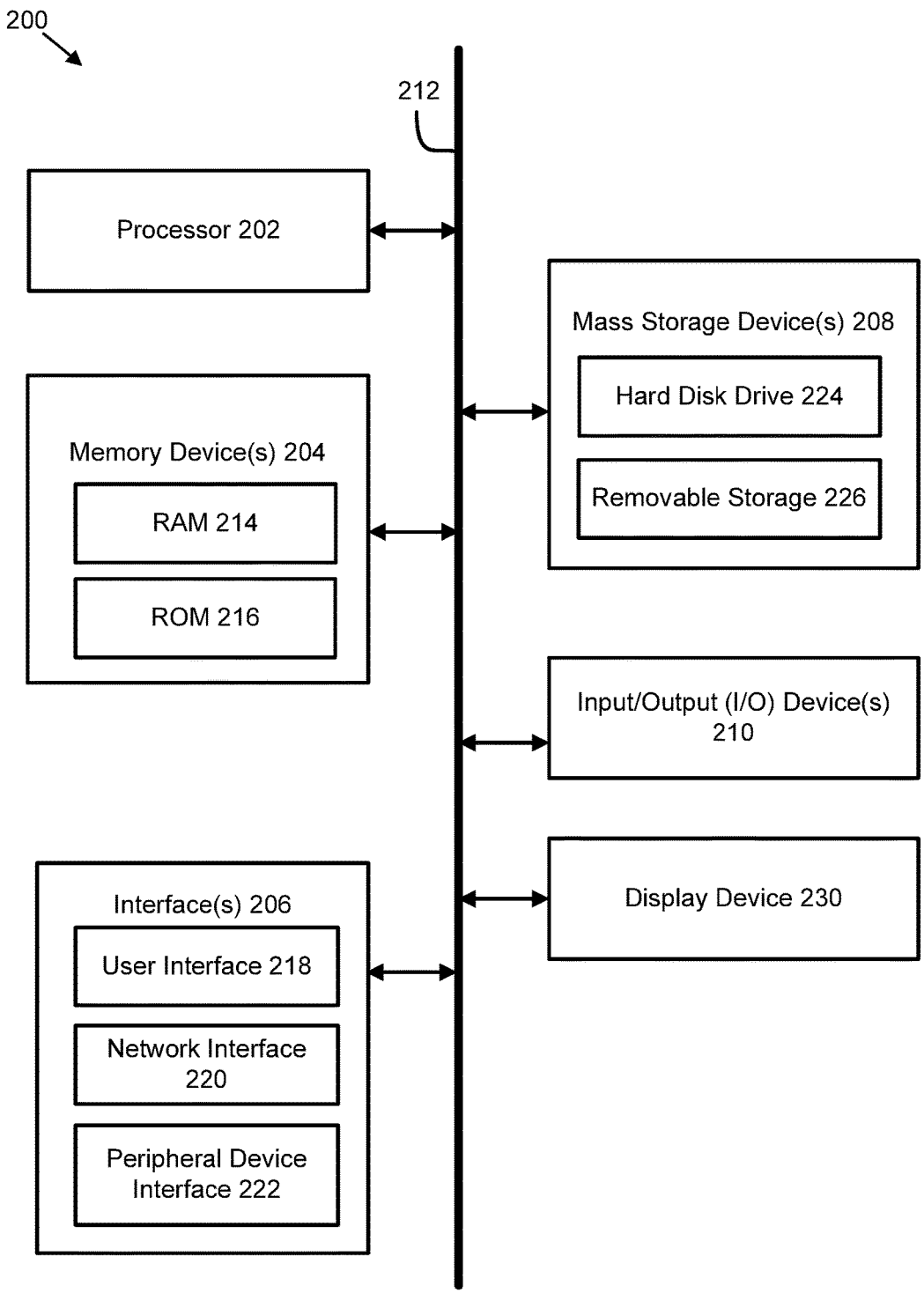
FIG. 2 is a schematic block diagram illustrating one embodiment of a system for historical transaction-based account monitoring.

FIG. 2 is a schematic representation of computing device 200 including computer hardware and protocols that enable the various embodiments discussed herein. Implementations of the present disclosure may comprise or utilize a special purpose computer, including computer hardware, such as, for example, one or more processors and system memory, as discussed in greater detail below. Implementations within the scope of the present disclosure may also include physical and other computer-readable media for carrying or storing computer-executable instructions and/or data structures.

Such computer-readable media can be any available media that can be accessed by a general purpose or special purpose computer system. Computer-readable media that store computer-executable instructions may be computer storage media (devices). Computer-readable media that carry computer-executable instructions may be transmission media. Thus, by way of example, and not limitation, implementations of the disclosure may comprise at least two distinctly different kinds of computer-readable media: computer storage media (devices) and transmission media.

Computer storage media (devices), in some embodiments, includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which may be accessed by a general purpose or special purpose computer.

As described above, a data network 106, in one embodiment, may be defined as one or more data links that enable the transport of electronic data between computer systems and/or modules and/or other electronic devices. In an implementation, computers may be networked in order to communicate with each other, and other components, connected over the network 106 to which they are connected. When information is transferred or provided over a network 106 or another communications connection (either hardwired, wireless, or a combination of hardwired or wireless) to a computer, the computer may properly view the connection as a transmission medium. Transmissions media may include a network 106 and/or data links, which may be used to carry desired program code means in the form of computer-executable instructions or data structures and which may be accessed by a general purpose or special purpose computer. Combinations of the above should also be included within the scope of computer-readable media.

Further, upon reaching various computer system components, program code may be in the form of computer-executable instructions or data structures that may be transferred automatically from transmission media to computer storage media (devices) (or vice versa). For example, computer-executable instructions or data structures received over a network 106 or data link may be buffered in RAM within a network interface module (e.g., a "NIC"), and then eventually transferred to computer system RAM and/or to less volatile computer storage media (devices) at a computer system. RAM may also include solid state drives (e.g., SSDs or PCI-based real-time memory tiered storage, such as provided by FusionIO®). Thus, it should be understood that computer storage media (devices) may be included in computer system components that also (or even primarily) utilize transmission media.

Computer-executable instructions may comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network 106, both perform tasks. In a distributed system environment, program modules may be located in both local and remote memory storage devices.

Further, where appropriate, functions described herein may be performed in one or more of: hardware, software, firmware, digital components, or analog components. For example, one or more application specific integrated circuits (ASICs) or field programmable gate arrays (FPGAs) may be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Illustrated in the figure is a block diagram illustrating an example computing device 200. Computing device 200 may be used to perform various procedures, such as those discussed herein. Computing device 200 may function as a server, a client, or any other computing entity. Computing device 200 may perform various monitoring functions as discussed herein, and can execute one or more application programs, such as the application programs described herein. Computing device 200 may be any of a wide variety of computing devices, such as a desktop computer, a notebook computer, a server computer, a handheld computer, tablet computer and the like.

Computing device 200, in one embodiment, includes one or more processor(s) 202, one or more memory device(s) 204, one or more interface(s) 206, one or more mass storage device(s) 208, one or more Input/Output (I/O) device(s) 210, and a display device 230, all of which may be coupled to a bus 212. Processor(s) 202 may include one or more processors or controllers that execute instructions stored in memory device(s) 204 and/or mass storage device(s) 208. Processor(s) 202 may also include various types of computer-readable media, such as cache memory.

Memory device(s) 204 may include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 may include various computer readable media, such as magnetic tapes, magnetic disks, optical disks, solid-state memory (e.g., Flash memory), and so forth. As shown in the figure, a particular mass storage device is a hard disk drive 224. Various drives may also be included in mass storage device(s) 208 to enable reading from and/or writing to the various computer readable media. Mass storage device(s) 208 may include removable media 226 and/or non-removable media.

I/O device(s) 210 may include various devices that allow data and/or other information to be input to or retrieved from computing device 200. Example I/O device(s) 210 may include digital imaging devices, electromagnetic sensors and emitters, cursor control devices, keyboards, keypads, microphones, monitors or other display devices, speakers, printers, network interface cards, modems, lenses, and the like.

Display device 230 may include any type of device capable of displaying information to one or more users of computing device 200. Examples of display device 580 include a monitor, a touch-screen display, a display terminal, a video projection device, and the like.

Interface(s) 206 may include various interfaces that allow computing device 200 to interact with other systems, devices, or computing environments. Example interface(s) 206 may include any number of different network interfaces 220, such as interfaces to local area networks (LANs), wide area networks (WANs), wireless networks, and the Internet. Other interface(s) may include user interfaces 218 and peripheral device interfaces 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 may allow processor(s) 202, memory device(s) 204, interface(s) 206, mass storage device(s) 208, and I/O device(s) 210 to communicate with one another, as well as other devices or components coupled to bus 212. Bus 212 may represent one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein may be implemented in hardware, or a combination of hardware, software, and/or firmware. For example, one or more application specific integrated circuits (ASICs) or field programmable gate arrays (FPGAs) may be programmed to carry out one or more of the systems and procedures described herein.

Figure 3:
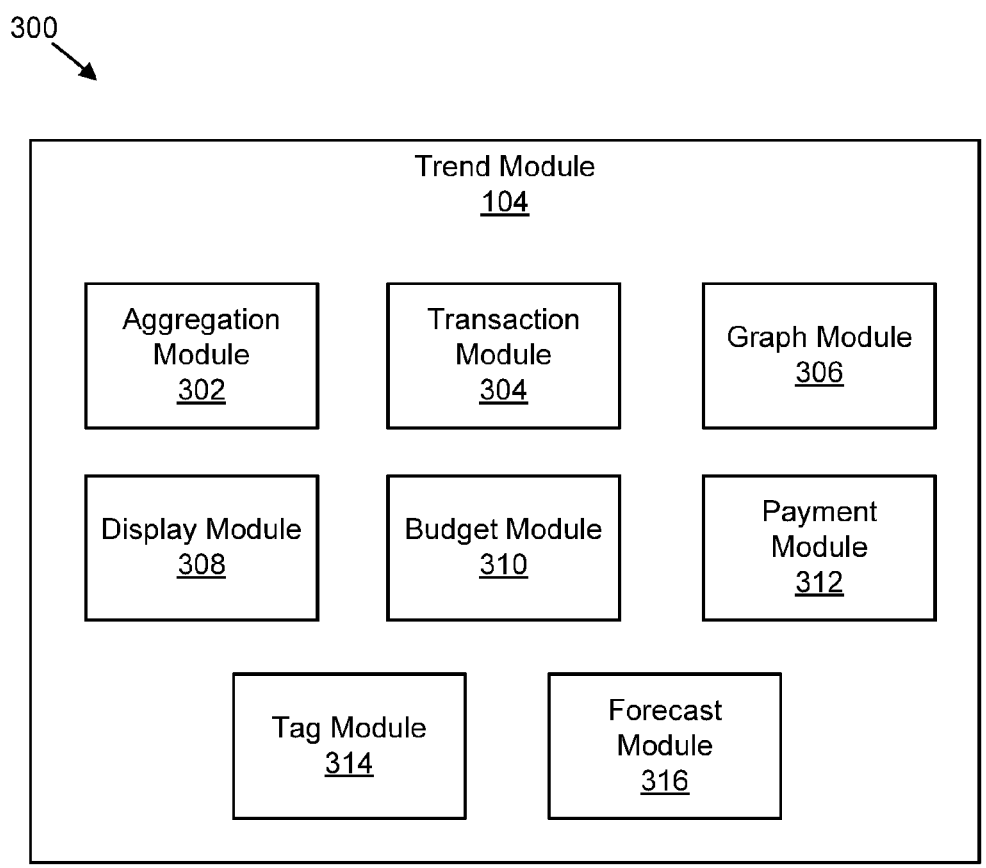
FIG. 3 is a schematic block diagram illustrating one embodiment of a module for historical transaction-based account monitoring.

FIG. 3 depicts an embodiment of a module 300 for historical transaction-based account monitoring. In one embodiment, the module 300 includes an embodiment of a trend module 104. The trend module 104 may include one or more of an aggregation module 302, a transaction module 304, a graph module 306, a display module 308, a budget module 310, a payment module 312, a tag module 314, and a forecast module 316, which are described in more detail below.

In one embodiment, the aggregation module 302 is configured to receive financial data for a user over a data network 106. The financial data may include transaction data, account data, debt data, loan data, budgets, goals, and/or the like. In some embodiments, the financial data is received from one or more financial institutions 108 where the user has a user account such as a checking account, a car loan, a brokerage account, and/or the like. In some embodiments, the aggregation module 302 receives financial data from an aggregation system 110, which may provide financial data for each account that the user has a plurality of financial institutions.

The financial data that the aggregation module 302 receives may include a record of transaction data. As used herein, a transaction may comprise an income event (e.g., receiving a paycheck, receiving a refund or rebate, receiving dividends, and/or the like) or an expense event (e.g., making purchases, making a car payment, making a credit card payment, making a mortgage payments, and/or the like). The transaction data may include historical transaction data and/or current transaction data. As used herein, historical transaction data include transaction data for a historical period of time, e.g., a time period that is previous than a defined current time period. For example, if the current time period is defined as the current year, then the historical transaction data may comprise transactions recorded any time previous to the current year. Similarly, if the current time period is defined as the current month, then the historical transaction data may comprise transaction recorded any time previous to the current month.

In one embodiment, the transaction module 304 is configured to determine one or more transactions of the historical transaction data that correspond to one or more transactions of the current transaction data. For example, assuming the current time period is January 2010, the current transaction data may comprise transactions for two paychecks received in January 2010. The transaction module 304 may determine one or more corresponding transactions from the historical transaction data, e.g., one or paychecks received in January 2009, January 2008, and so on, as defined by a user. In this manner, the transaction module 304 may determine transactions that correspond over a period of time so that appropriate comparisons may be made between the historical transaction data and the current transaction data.

In a further embodiment, the transaction module 304 is configured to normalize the determined transactions of the historical transaction data for the historical time period. For example, if the historic time period comprises the previous five years' worth of transaction data, the transaction module 304 may normalize the historical transaction data by taking an average of each corresponding transaction for each month of a year for the past five years. In an example embodiment, each corresponding transaction for January 2005-2010 may be averaged (e.g., mortgage payments, grocery payments, movie payments, paycheck deposits, and/or the like), each corresponding transaction for February 2005-2019 may be averaged, and so on. In this manner, a single, normalized transaction trend over the course of a single year, but which incorporates data for each year of the historical time period (e.g., 5 years) may be determined, which may then be compared against the current transaction data to determine whether the user is on track, falling behind, or making progress towards one or more budgets or goals.

In one embodiment, the graph module 306 is configured to generate a graphical representation of the corresponding historical transaction data and a graphical representation of the corresponding current transaction data. In one embodiment, the generated graphical representation may comprise a line graph, a bar graph, a pie chart, a calendar, a timeline, and/or the like. In one embodiment, for example, the graph module 306 may generate a line graph (e.g., may calculate data points, axis scales, axis values, and/or the like) for a historical trend of transactions for a period of time (e.g., a year, a month, six months, and/or the like) based on the historical transaction data.

The graphical representation for the historical transaction data may include a graphical representation of the normalized data such that the graph module 306 only generates a single graphical representation of the historical transaction data. In a further embodiment, the graph module 306 generates a graphical representation for a plurality of time periods of the historical time period. For example, if the historical time period is the previous five years, the graph module 306 may create a graphical representation of the historical data for each year of the previous five years. In such an embodiment, the graph module 306 may use non-normalized historical transaction data to create a graphical representation of each time period within the historical time period. In a further embodiment, the graph module 306 generates a graphical representation of the transaction data for the current time period.

In one embodiment, the display module 308 is configured to display the graphical representation of the historical transaction data and the graphical representation of the current transaction data within an interface on the display device 230. The interface may include a web page, a mobile application, a desktop application, and/or the like. For example, the display module 308 may display the graphical representation of the historical transaction data and the graphical representation of the current transaction data on a graph presented in a mobile finance application. The display device 230, in one embodiment, may include a touch-enabled display device (e.g., a touch screen) and may be integrated with or otherwise electrically coupled to an information handling device 102, such as a mobile device.

In one embodiment, the display module 308 presents the graphical representations of the historical transaction data and the current transaction data together within the same interface, e.g., on the same graph, chart, etc. For example, the display module 308 may present the graphical representations of the historical transaction data and the current transaction data on a time-based graph, and may automatically determine a scale of one or more axes of the graph based on the historical and current transaction data such that each graphical representation is visible on the graph.

In this manner, the display module 308 may increase the usability of the interface by providing a way for the user to visualize historical transaction data and current transaction data at the same time. In some embodiment, the display module 308 presents additional information for a data point on either of the graphical representations of the historical transaction data and the current transaction data. For example, the user may tap, click, or otherwise select a data point on a line graph of the current transaction data to trigger the display module 308 to present a pop-up or other interface element that includes specific information regarding the transaction at the selected data point, such as the transaction amount, the location of the transaction, the nature of the transaction, a transaction date, and/or the like.

In one embodiment, the budget module 310 is configured to create one or more budget plans for the user based on one or more of the historical transaction data, the current transaction data, and one or more user-defined goals. The one or more user-defined goals may include goals or budgets related to cash flow, revenue, assets, debts, equity, liabilities, investments, inventory, and/or the like. For example, the user may specify a goal of maintaining a cash flow above a specified amount for the current month. Based on the historical transaction data corresponding to the current month, and the current monthly income and expense, the budget module 310 may generate a budget for the user's cash flow with the goal of maintaining the cash flow at or above the specified amount. The budget plan may include different recommendations, results, strategies, and/or the like for assisting a user with satisfying the budget plan.

In one embodiment, the budget module 310 presents the budget plans to a user in a graphical interface. In one embodiment, the budget module 310 presents the one or more budget plans as part of the graphical representations of the historical transaction data and the current transaction data. Accordingly, when a user selects a budget plan, the budget module 310 may present new recommendations, suggestions, and/or the like, in real-time, for meeting the budget plan based on trends of the historical and current transaction data as depicted in the graphical representations of each respective set of data. For example, the budget module 310 may suggest that the user eat out less frequently, or pay extra towards a car payment, and/or the like, based on the user's goals and the created budget plans.

In one embodiment, the budget module 310 presents one or more recommendations or suggestions for switching one or more accounts to a different financial institution. For example, the budget module 310 may recommend that the user switch his auto loan from his current bank to a different bank that is offering a lower interest rate. In one embodiment, the one or more recommendations are associated with a selected budget plan. For example, if the user selects a budget plan that includes paying down debt in the current month, the budget module 310 may present an offer from a different bank to transfer his credit card balance to the bank and receive an interest free offer for 12 months, which may reduce the amount of the debt over time.

In one embodiment, the payment module 312 is configured to initiate a wireless payment at a point of sale device, e.g., a retail kiosk, an ATM, and/or the like, using one or more sensors of an information handling device 102. For example, the payment module 312 may initiate a wireless payment using a near-field communication ("NFC") sensor, a magnetic secure transmission ("MST") sensor, an infrared sensor, a proximity sensor, and/or the like, which may be integrated into a mobile device like a smart phone.

In such an embodiment, the payment module 312 may use the one or more sensors to transmit payment information associated with the user to pay for a purchase at a point of sale device of a retailer. For example, the payment module 312 may transmit credit card information, bank account information, and/or the like to process the payment. The payment module 312, however, may refuse processing the payment if it is determined that completing the transaction will cause the user to surpass a threshold budget amount in an account beyond a selected budget plan. For example, if the selected budget plan specifies that user have at least $3,000 or more in a savings account at the end of the month, and the purchase would cause the balance of the savings account drop below $3,000, then the payment module 312 may refuse processing the payment. The payment module 312 may also provide an alert or notification to the user as to the status of the user's accounts and budgets, and the reasons why the payment module 312 refused the transaction.

In certain embodiments, the payment module 312 may process the transaction in response to a user overriding the refusal of the payment module 312 to process the payment, even though the transaction may not comply with the user's budgets. For example, the payment module 312 may present a notification or alert on a display device 230 of a mobile device of the user to notify the user that processing the payment will cause a balance in a checking account to be less than a threshold value. The user may confirm refusal of the payment or override the refusal and trigger the payment module 312 to process the payment.

In certain embodiments, the payment module 312 may use the historical transaction data to determine whether to refuse processing the payment. For example, if a wireless payment would cause an amount in a checking account to dip below a threshold amount of $1,000, but the payment module 312 determines that the user usually receives a paycheck in a couple days, the payment module 312 may process the payment, and/or notify the user regarding the payment, the balance in the checking account, and any transactions that typically occur in the near future (e.g., paychecks, bill payments, and/or the like) so that the user can determine whether to process the payment or not.

In one embodiment, the tag module 314 is configured to tag each of the transactions of the aggregated transaction data with one or more categories. The one or more categories may be based on one or more characteristics of the transaction. For example, if a transaction was processed at Costco®, the tag module 314 may tag the transaction with keywords like "Costco," "grocery," "food," "gas," and/or the like.

In one embodiment, the tag module 314 tags a transaction with a category based on one or more items purchased during the transaction. Continuing with the above example, the tag module 314 may tag the Costco® transaction with "electronics," "tools," "office equipment," and/or the like if a television, a drill gun, and an office chair were purchased at Costco®. The one or more categories may be predefined by a user and stored in a database such that the tag module 314 may lookup one or more tags in the database based on one or more characteristics of the transaction. In certain embodiments, a transaction of the historical transaction data corresponds to a transaction of the current transaction data, or another transaction of the historical transaction data, in response to one or more tags of the transaction of the historical transaction data matching one or more tags of the transaction of the current transaction data.

In one embodiment, the forecast module 316 is configured to determine one or more forecasts for balances in one or more of the plurality of accounts based on the historical transaction data and the current transaction data for one or more future time periods. For example, based on the current balance in a checking account, the forecast module 316 may predict how much money will be in the account at the end of the next month, or at the end of the current year, based historical trends derived from the historical transaction data. The budget module 310 may use the forecasts to determine one or more budgets, goals, plans, recommendations, suggestions, and/or the like. For example, if the forecast module 316 determines that an account balance at the end of the year may be below a predetermined threshold or goal balance for the account, the budget module 310 may determine one or more spending suggestions for the user, adjust a current budget plan, and/or the like based on the forecasts.

Figure 4:
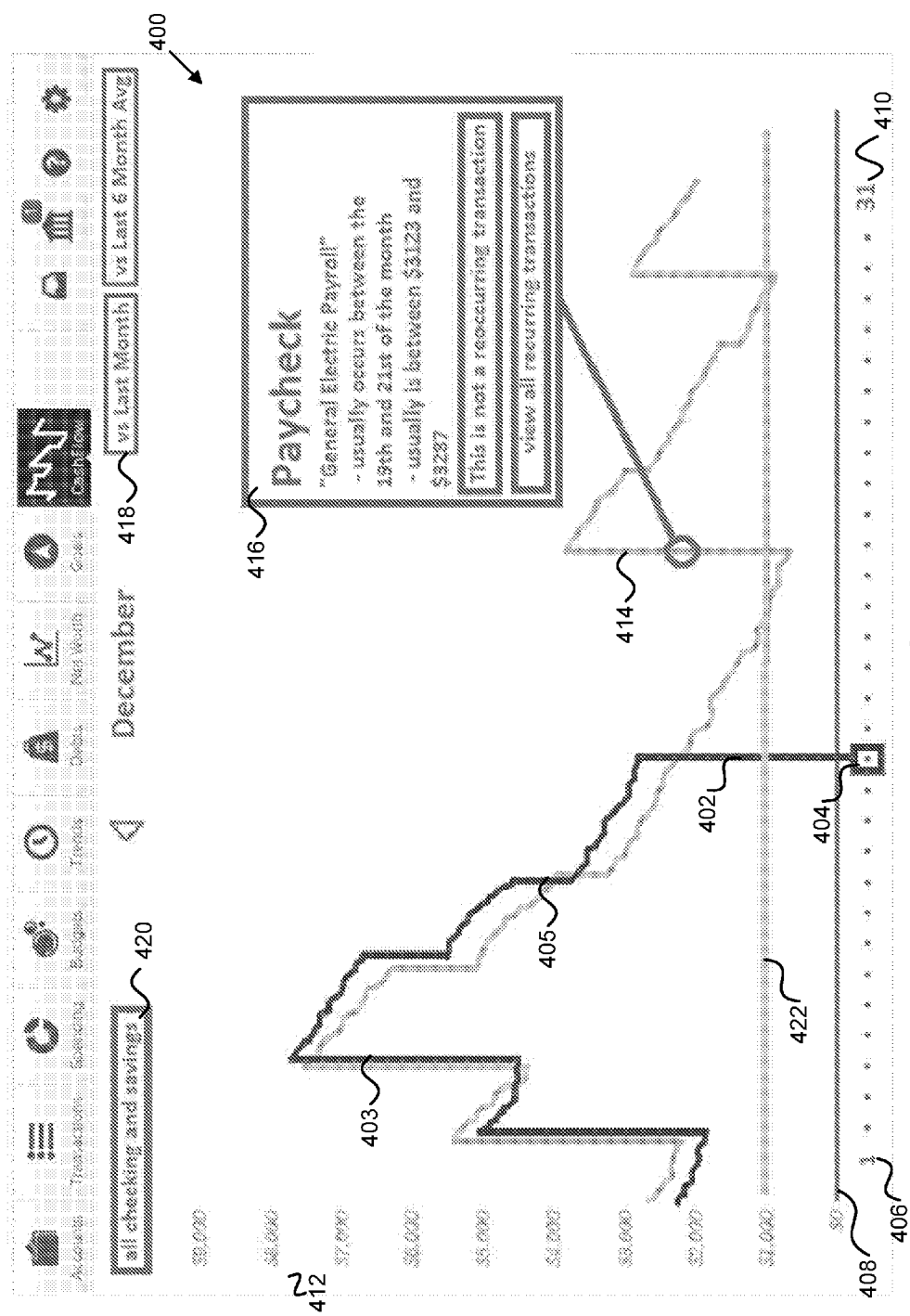
FIG. 4 depicts an embodiment of an interface for historical transaction-based account monitoring.

FIG. 4 depicts an embodiment of an interface 400 for historical transaction-based account monitoring. In one embodiment, the graph module 306 may generate a graphical representation of historical transaction data 414 and current transaction data 402, which are both aggregated transaction data across a plurality of the user's accounts, and the display module 308 may present the graphical representations of the transaction data 402, 414 on the interface 400. A current time period 404 may be represented on the x-axis, which spans a time period of interest from a beginning time 408 to and ending time 410. The y-axis 412 of the graph, diagram, or chart may represent balances of the user's assets, funds, inventory, and/or other resources.

In one embodiment, the time period may be a single month, a plurality of months, a quarter of a year, one or more years, or any other time period selected by a user. The graphical representation of the current transaction data 402 may comprise current transactions that have occurred during the time period in question. For example, an increase spike 403 in the graph may indicate an increase in assets, funds, inventory, and/or other resources, whereas a decrease spike 405 in the graph may indicate attrition or losses in assets, funds, inventory, or other resources. Such increases may be recurring transactions, such as, for example, receiving regular paychecks, an increase in assets, funds, inventory, and/or other resources due to manufacturing, or an increase in other resources that may be recurring on regular or nearly regular intervals.

The graphical representation 414 of the historical transaction data may be generated by normalizing or averaging a plurality of transaction data that corresponds to a particular time period. For example, the graphical representation 414 of the historical transaction data may represent the previous month, two months, three months, plurality of months, year, years or some other period of time that may be selected by the user to help a user see trends based on the current data set versus the normalized data set. The time period may also be suggested to the user in a default setting or series of preselected default settings.

The interface 400 may also comprise an overlay view of the graphical representation of the historical transaction data 414 and the graphical representation of the current data set 402 over the same period of time, such as previous month versus current month, or previous three month time period versus current three month time period (quarterly), or previous year versus current year, or the like, such that data points from within the graphical representation of the historical transaction data 414 and the graphical representation of the current transaction data 402 correspond to one another, thereby allowing the user to identify trends relating to the user's assets, funds, inventory, or other resources over time.

In one embodiment, the transaction module 304 may normalize the historical transaction data with weighted averages. In some embodiments, the display module 308 may present additional data 416 associated with a transaction, either on the graphical representation of the historical transaction data or the graphical representation of the current transaction data, in response to a user hovering over a transaction, clicking on a transaction, and/or otherwise selecting a transaction on the graph. For example, the transaction module 304 may recognize, identify, classify or categorize an increase spike 403 or decrease spike 405 in assets, funds, inventory, or other resources as recurring or reoccurring, such that when a user activates the detailed view 416, additional data is provided to a user, such as "payroll," and provides the date or date range on which such transaction typically occurs, along with the amount of the typical transaction. The transaction module 304 may also allow the user to confirm that a selected transaction is recurring or reoccurring, or the user may decline to classify or categorize the transaction as recurring or reoccurring. The display module 308 may present to a user all recurring or reoccurring transactions over a given or determined time period.

In some embodiments, a user may select a predefined time period 418, such as the current transaction data vs. last months transactions, vs. the last six months of transactions, and/or the like. Similarly, the user may select which account 420 of a plurality of accounts to view the graphical representations of the historical and current transaction data. For example, the user may select their savings account, their checking account, their brokerage account, their mortgage account, and/or the like, which each may be located at a different financial institution.

The display module 308 may also present a line 422 representing a threshold balance determined by a selected budget plan. In the depicted embodiment, if an account balance is about to reach, reaches, and/or dips below the threshold balance 422, the user may be notified and the budget module 310 may provide one or more recommendations for increasing the balance above the threshold 422. Furthermore, the payment module 312 may use the threshold balance 422 to determine whether to process or refuse a wireless payment performed on a mobile device.

Figure 5:
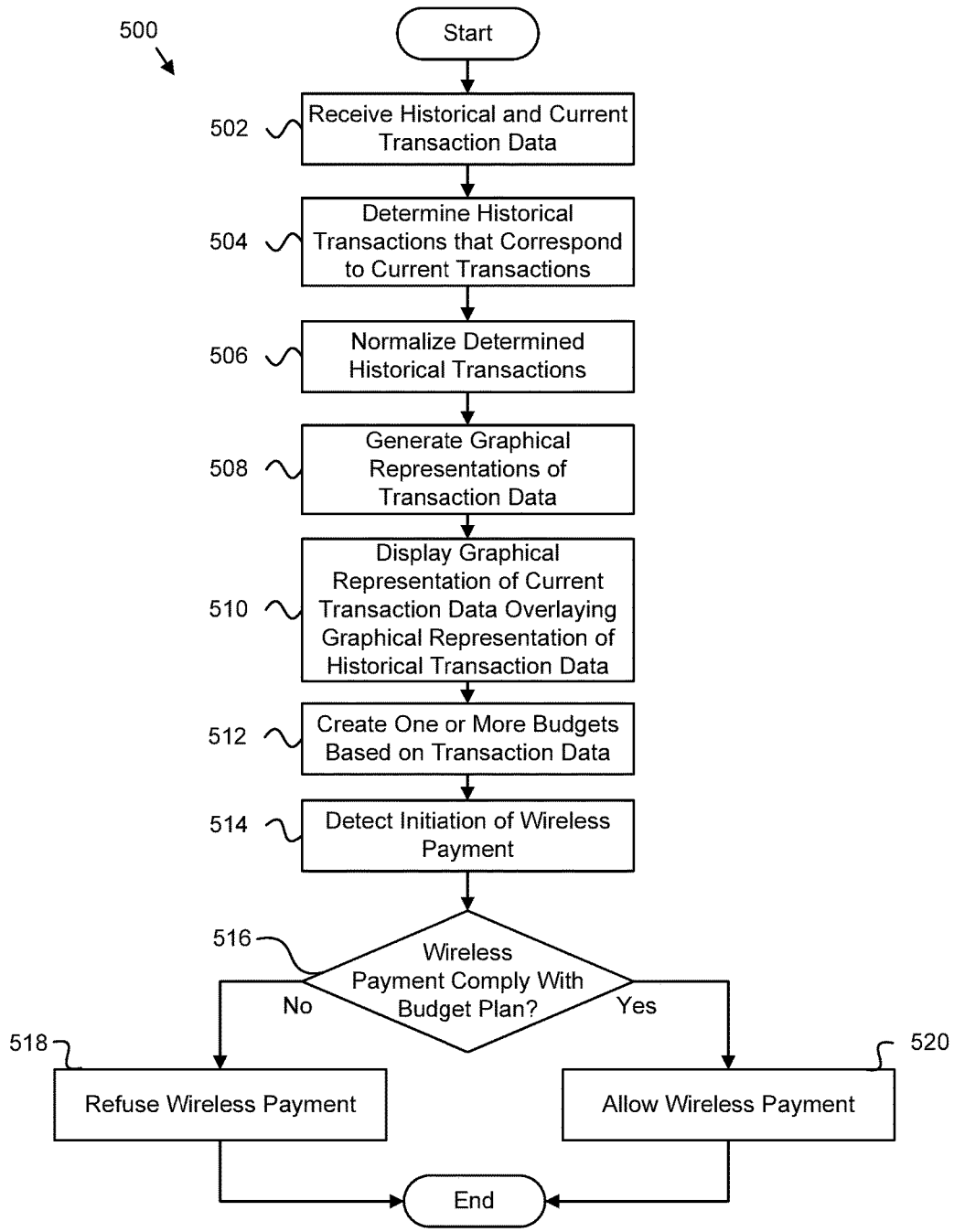
FIG. 5 is a schematic flow chart diagram illustrating one embodiment of a method for historical transaction-based account monitoring.

FIG. 5 is a schematic block diagram illustrating one embodiment of a method 500 for historical transaction-based account monitoring. In one embodiment, the method 500 begins, and the aggregation module 302 receives 502, over a computer network 106, aggregated transaction data for a plurality of accounts held by a user at a plurality of financial institutions. The transaction data may include transaction data for a historical time period and transaction data for a current time period.

In one embodiment, the transaction module 304 determines 504 one or more transactions of the historical transaction data that correspond to one or more transactions of the current transaction data. In certain embodiments, the transaction module 304 normalizes 506 the determined transactions of the historical transaction data for the historical time period.

In one embodiment, the graph module 306 generates 508 a graphical representation of the historical transaction data and a graphical representation of the current transaction data. The display module 308, in some embodiments, the display module 308 displays 510 the graphical representation of the historical transaction data and the graphical representation of the current transaction data within an interface on the display device. The graphical representation of the current transaction data may overlay the graphical representation of the historical transaction data.

In one embodiment, the budget module 310 creates 512 one or more budget plans for the user based on the historical transaction data, the current transaction data, and one or more user-defined goals. In a further embodiment, the payment module 312 detects 514 initiation of a wireless payment on a wireless device. The wireless payment may be initiated using one or more sensors of the wireless device that are in wireless communication with one or more sensors of a point of sale device and configured to process a wireless payment by wirelessly transmitting payment information from the wireless device to the point of sale device.

In one embodiment, the payment module 312 determines 516 whether the wireless payment complies with one or more of the user's budget plans determined based on the historical and current transaction data. If the wireless payment complies with the budget plan, meaning, for example, that the wireless payment does not cause the user's account to dip below a predetermined threshold level, then the payment module 312 processes or allows 520 the wireless payment, and the method 500 ends. Otherwise, if the wireless payment does not comply with the budget plan, the payment module 312 refuses 518 the wireless payment, and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a display device;
   a semiconductor integrated circuit device comprising:
      one or more pins configured to receive, over a computer network, aggregated transaction data for a plurality of accounts, the transaction data comprising transaction data for a historical time period and transaction data for a current time period, the historical time period comprising at least one historical time frame that corresponds to a current time frame of the current time period;
      one or more hardware circuits configured to determine one or more transactions of the historical transaction data that correspond to one or more transactions of the current transaction data, the determined transactions selected from a historical time frame of the historical time period that corresponds to the current time frame of the current time period;
      one or more hardware circuits configured to normalize the determined transactions of the historical transaction data for the historical time frame such that the historical transaction data for the historical time frame is comparable to corresponding transaction data for the current time frame;
      one or more hardware circuits configured to generate a graphical representation of the historical transaction data and a graphical representation of the current transaction data;
      one or more hardware circuits configured to display the graphical representation of the historical transaction data and the graphical representation of the current transaction data within an interface on the display device, the graphical representation of the current transaction data overlaying the graphical representation of the historical transaction data such that one or more transactions of the current transaction data that occurred within the current time frame of the current time period graphically corresponds to one or more transactions of the historical transaction data for a corresponding historical time frame of the historical time period;
      one or more hardware circuits configured to graphically display a line representing a threshold balance on the display of the graphical representation of the historical transaction data and the graphical representation of the current transaction data, the threshold balance determined according to a selected budget plan; and
      one or more hardware circuits configured to one or more of:
         send a notification to a user in response to an account balance satisfying the threshold balance; and
         refuse processing of a payment from the account associated with the threshold balance in response to the payment decreasing an amount in the account beyond the threshold balance.

2. The apparatus of claim 1, wherein the semiconductor integrated circuit device further comprises one or more hardware circuits configured to create one or more budget plans for a user based on one or more of the historical transaction data, the current transaction data, and one or more user-defined goals.

3. The apparatus of claim 2, wherein the one or more user-defined goals are related to one or more of cash flow, revenue, assets, debt, equity, liabilities, investments, and inventory.

4. The apparatus of claim 1, wherein the semiconductor integrated circuit device further comprises one or more hardware circuits configured to generate a plurality of graphical representations of the historical transaction data corresponding to a plurality of time periods of the historical time period, each of the plurality of graphical representations of the historical transaction data being based on non-normalized historical transaction data for a particular time period.

5. The apparatus of claim 1, wherein the semiconductor integrated circuit device further comprises one or more hardware circuits configured to tag each of the transactions of the aggregated transaction data with one or more categories, the one or more categories based on one or more characteristics of the transaction data.

6. The apparatus of claim 5, wherein a transaction of the historical transaction data corresponds to a transaction of the current transaction data in response to one or more tags of the transaction of the historical transaction data matching one or more tags of the transaction of the current transaction data.

7. The apparatus of claim 1, wherein the semiconductor integrated circuit device further comprises one or more hardware circuits configured to present the graphical representations of the historical transaction data and the current transaction data on a time-based graph, wherein a scale of one or more axes of the graph is automatically determined based on the historical and current transaction data such that each graphical representation is visible on the graph.

8. The apparatus of claim 1, wherein the semiconductor integrated circuit device further comprises one or more hardware circuits configured to determine one or more forecasts for balances in one or more of the plurality of accounts based on the historical transaction data and the current transaction data for one or more future time periods.

9. The apparatus of claim 8, wherein one or more budget plans for a user is based on the determined forecasts for one or more of the plurality of accounts.

10. The apparatus of claim 1, further comprising one or more sensors electrically coupled to the semiconductor integrated circuit device and configured to wirelessly communicate with one or more sensors of a point of sale device.

11. The apparatus of claim 10, wherein the semiconductor integrated circuit device further comprises one or more hardware circuits configured to initiate a wireless payment at a point of sale device using the one or more sensors.

12. The apparatus of claim 11, wherein the semiconductor integrated circuit device further comprises one or more hardware circuits configured to process a wireless payment by wirelessly transmitting payment information to the point of sale device using the one or more sensors.

13. The apparatus of claim 12, wherein the semiconductor integrated circuit device further comprises one or more hardware circuits configured to refuse processing of the wireless payment in response to an amount of the wireless payment decreasing an amount in a user account beyond a user's selected budget plan.

14. An apparatus comprising:
a mobile device;
one or more sensors electrically coupled to the mobile device;
the mobile device comprising:
    a graph module that generates a graphical representation of transaction data for a historical time period and a graphical representation of transaction data for a current time period, the transaction data based on a set of aggregated transaction data for a plurality of accounts;
    a budget module that creates one or more budget plans for a user based on one or more of the historical transaction data, the current transaction data, and one or more user-defined goals;
    a display module that:
        presents the graphical representations of the historical transaction data and the current transaction data on a display of the mobile device; and
        graphically displays a line representing a threshold balance on the display of the graphical representation of the historical transaction data and the graphical representation of the current transaction data, the threshold balance determined according to a selected budget plan; and
    a payment module that detects initiation of a mobile payment on the mobile device, the mobile payment being initiated using the one or more sensors of the mobile device, the one or more sensors of the mobile device in wireless communication with one or more sensors of a point of sale device and configured to process a mobile payment by wirelessly transmitting payment information from the mobile device to the point of sale device, wherein the payment module refuses processing the mobile payment from at least one of the plurality of accounts on the mobile device in response to an amount of the mobile payment decreasing a balance of the at least one of the plurality of accounts beyond the threshold balance.

15. The apparatus of claim 14, further comprising a transaction module that determines one or more transactions of the historical transaction data that correspond to one or more transactions of the current transaction data.

16. The apparatus of claim 15, wherein the transaction module further normalizes the determined transactions of the historical transaction data for the historical time period.

17. The apparatus of claim 14, wherein the graph module is further configured to generate a plurality of graphical representations of the historical transaction data corresponding to a plurality of time periods of the historical time period, each of the plurality of graphical representations of the historical transaction data being based on non-normalized historical transaction data for a particular time period.

18. A method comprising:
receiving, at a mobile device connected to a computer network, aggregated transaction data for a plurality of accounts, the transaction data comprising transaction data for a historical time period and transaction data for a current time period;
normalizing transactions of the historical transaction data for the historical time period based on one or more transactions of the historical transaction data that correspond to one or more transactions of the current transaction data;
generating a graphical representation of the historical transaction data and a graphical representation of the current transaction data;
displaying the graphical representation of the historical transaction data and the graphical representation of the current transaction data within an interactive interface on a touch screen display, the graphical representation of the current transaction data overlaying the graphical representation of the historical transaction data;

graphically displaying a line representing a threshold balance on the display of the graphical representation of the historical transaction data and the graphical representation of the current transaction data, the threshold balance determined according to a selected budget plan;

dynamically presenting one or more details of a transaction in response to a user selecting a transaction on one of the graphical representation of the historical transaction data and the graphical representation of the current transaction data, using the touch screen display;

sending a notification to a user in response to an account balance satisfying the threshold balance; and refusing processing of a payment from the account associated with the threshold balance in response to the payment decreasing an amount in the account beyond the threshold balance.

19. The method of claim 18, wherein the mobile device further comprises one or more sensors electrically coupled to the semiconductor integrated circuit device and configured to wirelessly communicate with one or more sensors of a point of sale device, the one or more sensors configured to wirelessly communicate with a point of sale device to initiate a mobile payment and wirelessly transmit payment information to the point of sale device.

20. The method of claim 19, further comprising refusing processing of the wireless payment in response to an amount of the wireless payment decreasing an amount in a user account beyond the user's selected budget plan.

* * * * *